(12) United States Patent
Mattchen et al.

(10) Patent No.: US 8,043,332 B2
(45) Date of Patent: Oct. 25, 2011

(54) SURGICAL CABLE PROVIDING VISUAL INDICATION OF TENSION

(76) Inventors: Terry M. Mattchen, Santa Barbara, CA (US); James B. Gerken, Pasadena, CA (US)

( * ) Notice: Subject to any disclaimer, the term of this patent is extended or adjusted under 35 U.S.C. 154(b) by 503 days.

(21) Appl. No.: 11/537,449

(22) Filed: Sep. 29, 2006

(65) Prior Publication Data

US 2008/0078320 A1   Apr. 3, 2008

(51) Int. Cl.
*A61B 17/04* (2006.01)
*A61B 17/10* (2006.01)
*A61L 17/00* (2006.01)

(52) U.S. Cl. .................................. 606/228; 606/139

(58) Field of Classification Search .......... 606/250–259, 606/261–263
See application file for complete search history.

(56) References Cited

U.S. PATENT DOCUMENTS

| 5,922,996 | A  | * | 7/1999  | Ryeczek ..................... 174/112 |
| 6,105,224 | A  | * | 8/2000  | O'Mara et al. ................. 28/271 |
| 6,108,475 | A  | * | 8/2000  | Chapin et al. ................ 385/128 |
| 6,994,719 | B2 | * | 2/2006  | Grafton ........................ 606/228 |
| 2004/0199241 | A1 | * | 10/2004 | Gravett et al. ............... 623/1.13 |
| 2006/0155328 | A1 | * | 7/2006  | Foerster ....................... 606/228 |
| 2006/0246802 | A1 | * | 11/2006 | Hughes et al. ................ 442/327 |

* cited by examiner

*Primary Examiner* — Thomas C. Barrett
*Assistant Examiner* — Sameh Boles
(74) *Attorney, Agent, or Firm* — Laura Tunnell

(57) ABSTRACT

A cable in accordance with the invention includes at least one core filament having a visually distinctive appearance; and a jacket, wrapped around at least a portion of said core filament. The jacket is adapted to change its opacity in response to tensile stress, thereby modulating the visibility of the core filament in relation to such stress. As a result, the overall appearance of the cable responds to stress, by changing at least one of chroma, hue, or value (visual appearance) quantifiably in response to tension.

8 Claims, 5 Drawing Sheets

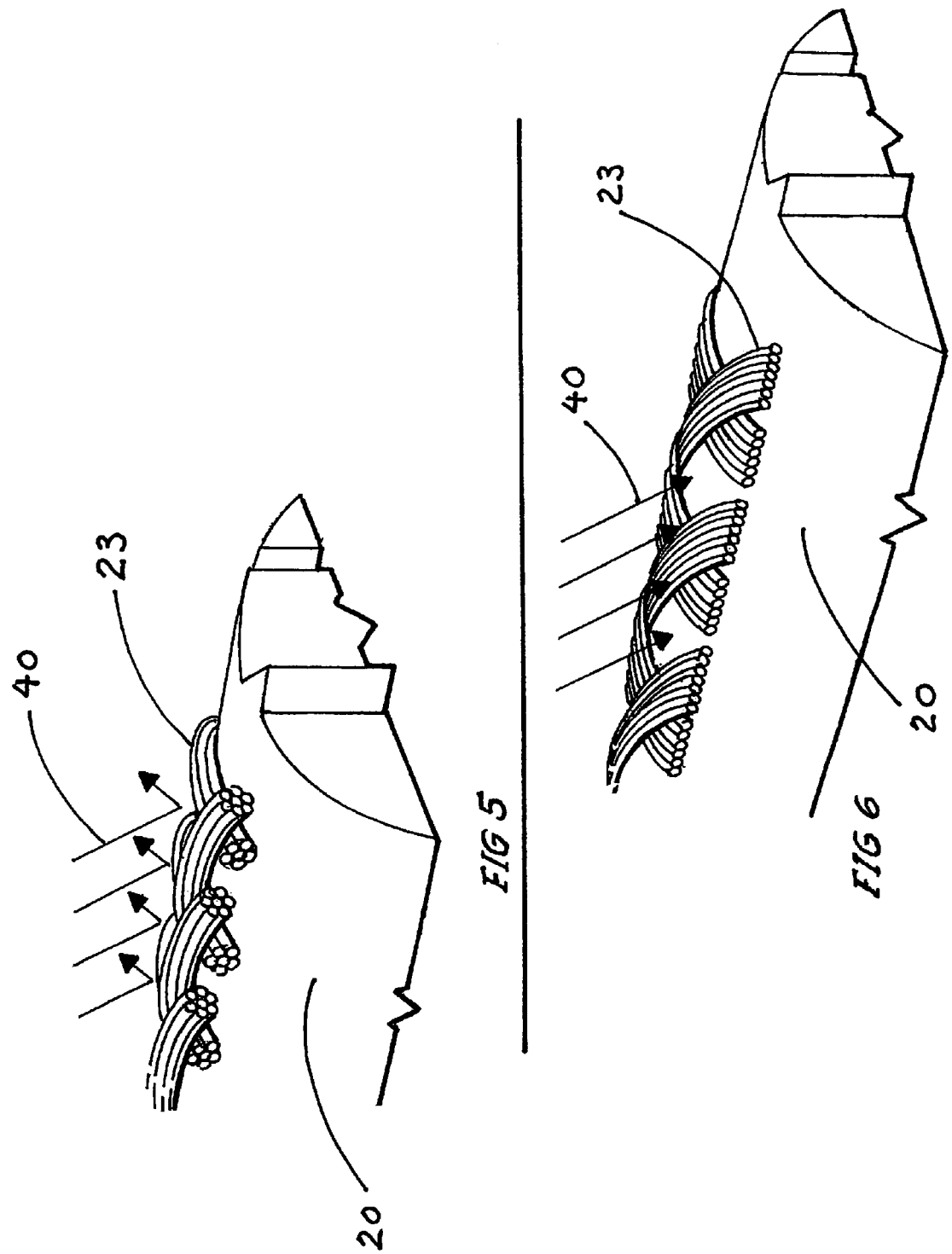

SURGICAL CABLE PROVIDING VISUAL INDICATION OF TENSION

BACKGROUND OF THE INVENTION

1. Field of the Invention

This invention relates to instruments and methods for orthopedic surgery generally and more specifically to elastic cables adapted for fixation of fractured bones.

2. Description of the Related Art

In various medical procedures wires or cables are used to join or stabilize fractured bones. Typically, metal alloy cables are preferred; but synthetic polymer cables are sometimes employed. For example, U.S. Pat. No. 6,093,190 to Mattchen describes a method of using elastomeric cables to stabilize and compress fractured bones, by spanning a network of tensioned cables across a fracture. Such a network can provide stable fixation of a fracture in both linear and torsional directions. The method disclosed also provides a tensile preload across the fracture, tending to compress the fracture and maintain fixation despite tensile and shear loads (such as those resulting from movement, weight bearing and bone remodeling).

In addition to the use of cables in more-or-less permanent surgical implants, surgeons commonly find use for temporary tensile connections during orthopedic surgery. Often surgical techniques demand temporary application of tension to counteract muscles and ligaments or otherwise to manipulate bony structures.

In most cases, wires or cables are manipulated during surgery without the benefit of an accurate measurement of the applied tension. From time to time, however, it is desirable to tense an orthopedic cable to a specific, predetermined amount of force. Instruments are known, such as strain gauges and scales, that are capable of accurately measuring cable tension; Instruments have been devised to tension a cable to a predetermined force. However, such devices are often inconvenient, unwieldy, and expensive. Such instruments require routine calibration and maintenance. In addition, such instruments must be designed to withstand sterilization conditions (including autoclave temperatures). Some orthopedic devices have been introduced that attempt to provide a visual indication of tension. See, for example, U.S. Pat. No. 4,936,843 to Sohngen (1990). Nevertheless, a need persists for a simple, convenient means of measuring and displaying cable tension in the context of orthopedic surgery.

SUMMARY OF THE INVENTION

In view of the above problems, the present invention is a surgical cable, suitable for use in orthopedic surgery. The cable in accordance with the invention includes at least one core filament having a visually distinctive appearance; and a jacket, wrapped around at least a portion of said core filament. The jacket is adapted to change its opacity (or transparency) in response to tensile stress, thereby modulating the visibility of the core filament in relation to such stress. As a result, the overall superficial appearance of the cable responds to tension by changing at least one of chroma, hue, or value (visual appearance).

In a method aspect, the invention includes a method for measuring tension. The method includes the steps of: providing a cable in accordance with the apparatus of the invention; placing the cable under tension; observing the visual appearance of the cable; and comparing the appearance with a calibrated visual reference, said reference relating the appearance to a corresponding cable tension.

In another method aspect, the invention includes a method for tensioning a cable to a predetermined force, including the steps: providing a cable in accordance with the apparatus of the invention; progressively applying increasing tension to the cable; observing the visual appearance of the cable; fixing the tension when the visual appearance matches a threshold state known to correspond to the desired, predetermined force.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 5 is a perspective view of a cable in a slack state, with a portion of the sheath cut away to expose a cross section of the yarns comprising the sheath; and FIG. 6 shows the same view as FIG. 5 above, but with the cable under tension, showing a change in configuration of the sheath fibers.

DETAILED DESCRIPTION OF THE INVENTION

Figure 1:
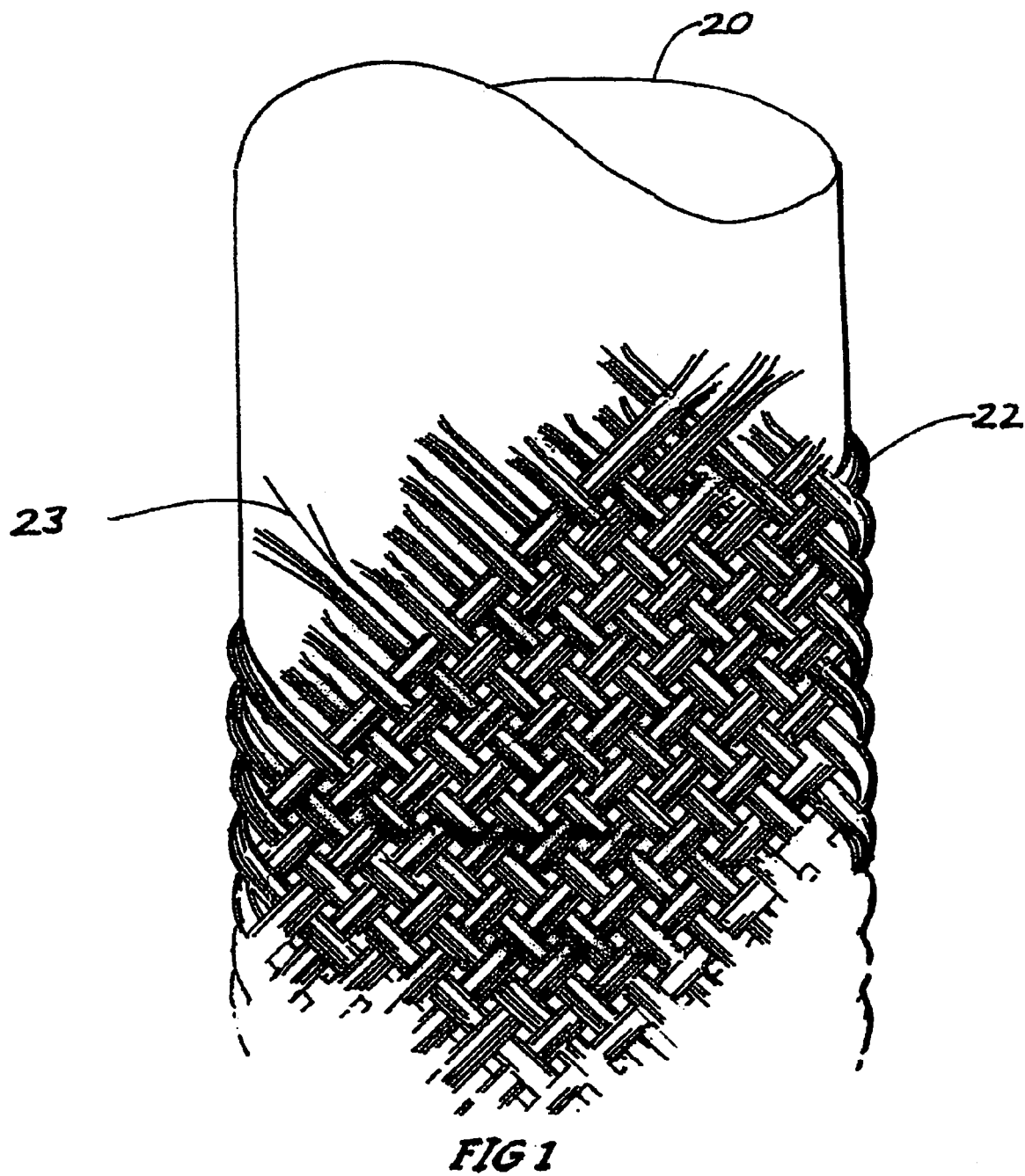
FIG. 1 is a perspective view of a cable in accordance with the invention, having jacket partially peeled back and unravelled to better visualize the cable's construction.

In the perspective view of FIG. 1 a segment of cable in accordance with the invention is shown. A core 20 comprises at least one fiber. A section of helical braided or woven jacket 22 generally coaxially surrounds the core 20. The figure depicts the jacket 22 loosened to reveal the core 20. This unraveled view is chosen to facilitate visualization of the cable's multiple layers, it being understood that the manufactured cable will typically take the form of a length of cable with ends terminated cleanly, without any unraveled portion of jacket.

In accordance with an apparatus aspect of the invention, a novel cable includes at least one core filament 20 having a distinctive visual appearance. In the embodiment shown, the core 20 includes a single filament (monofilament); but more core filaments may be used without departing from the invention. The core filaments 20 may suitably comprise an elastic polymer material such as nylon. In a specific embodiment, for example, the core comprises a nylon monofilament of diameter 0.018 inches, available from Surgical Specialties in Reading, Pa. (as "nylon suture" material).

FIG. 1 also shows one yarn 23 of the sheath 22 partially parted to reveal that it may comprise multiple fibers collected into a generally parallel bundle.

Figure 2:
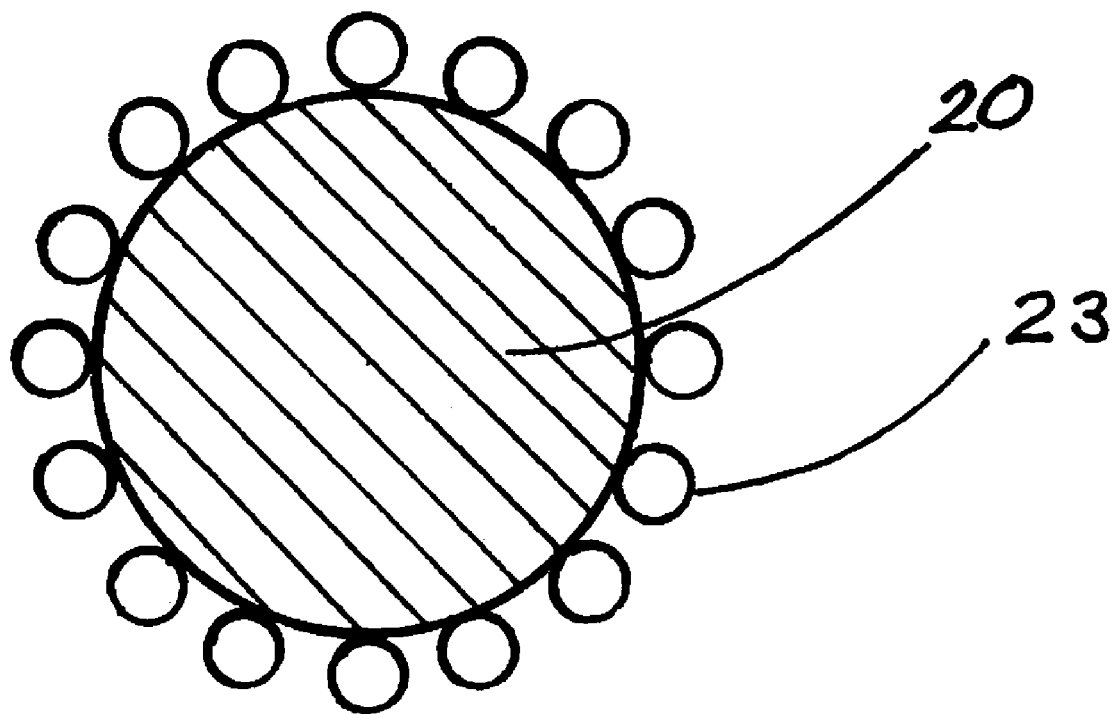
FIG. 2 is a cross section or the cable of FIG. 1.

FIG. 2 shows a cross section of the cable, showing the arrangement of core 20 (in the embodiment shown, a monofilament) and braided jacket 22.

At least one core filament 20 has a distinctive visual appearance that contrasts with the superficial appearance of the surrounding jacket 22 (described more particularly below). In a typical embodiment, the monofilament core 20 is dyed or otherwise permanently colored a dark color such as black. Alternatively, an easily visible color may be used, preferably an intensely saturated hue. The core 20 should preferably have a color that is easily discernible and discriminated, and should contrast with the coloration of the jacket 22. Although dyeing offers a reliable method of coloration, alternatives such as coating or surface impregnation could be used.

A braided or woven, generally tubular jacket or sheath 22 is disposed coaxially around at least a portion of the core filament or filaments 20. The jacket 22 should be woven tightly enough to snugly embrace the core 20. Furthermore, the braid or weave is adapted to constrict the jacket radially in response to increases in longitudinal tension. It will be appreciated that a longitudinal tension applied to the cable will tend to be distributed between the jacket 22 and core 20, causing both to elongate in accordance with their individual elastic characteristics. The characteristics of the sheath and core materials, and the particulars of the jacket weave, should be chosen to ensure that at least the significant portion of the elastic load is distributed to the jacket 22.

The jacket 22 is adapted to change its opacity (or conversely, transparency) in response to tensile stress, thereby modulating the visibility of the core filament(s) 20 in relation to cable tension. Because the core 20 has a distinctive visual appearance, the varying opacity of the jacket tends to modulate the visibility of the core, and hence the overall superficial appearance of the cable, in relation to the tension in the cable. A high degree of contrast between the jacket and the core tends to enhance this effect.

The inventors have found that a gel-spun, ultra-high molecular weight polyethylene material marketed under the trade name "Dyneema" (available from DSM, N.V. in Heerlen, The Netherlands, or from Greenville, N.C.) is suitable as the primary constituent of the jacket 22. Other materials can also be substituted or added, for example extended chain, high-modulus polyethylene fibers sold under the trade name "Spectra" (from Honeywell International).

Although fibers of the aforementioned polymers are microscopically seen as translucent, collectively as spun yarn or woven fabrics they can produce variable optical effects. A sheath woven or braided from yarns of either of these or similar materials is found to have an unusual optical/mechanical characteristic. When disposed around a core 20 as described and shown herein, such a sheath is generally white in appearance when not under tension (or under only moderate tension); but as the cable is progressively subjected to tension, the sheath tends to become more transparent, the degree of light transmission being in direct relation to the tension or stress in the fibers.

It will be easily seen that the mechanical-optical effects of the jacket produce a useful effect in the arrangement as described and shown in FIG. 1: when no tension is applied, the jacket tends to reflect or scatter outside ambient light from the sheath. The result is that the general appearance of the slack cable is dominated by the color and reflection of the outer sheath (in one embodiment, white). On the other hand, when a sufficiently high tension is applied (in excess of a threshold tension), the sheath becomes translucent and transmits ambient light, which reflects interacts with the underlying core filament(s) 20. The overall appearance is, in that state, that of the visually distinctive core filament(s) (for example, black). The change in appearance is easily discerned by human eye or, optionally, by electro-optical instrumentation.

Figure 3:
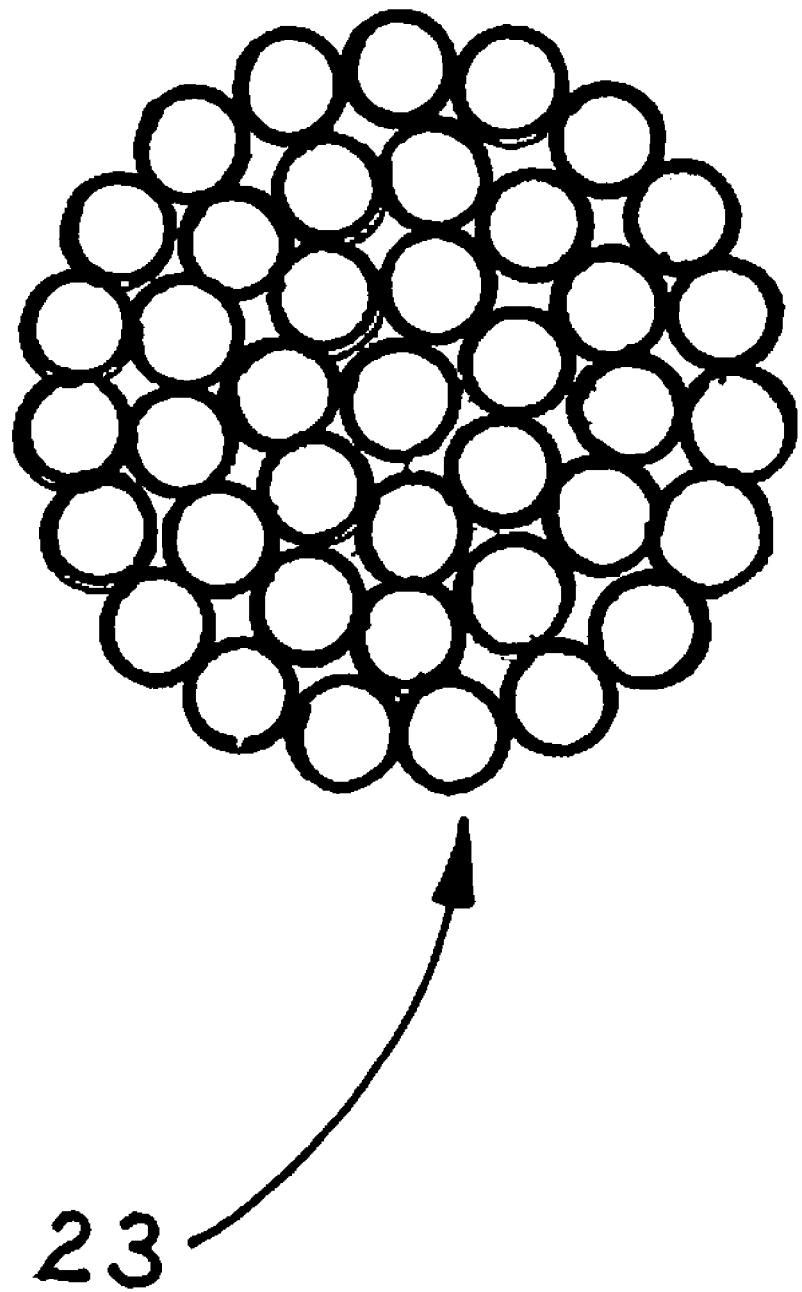
FIG. 3 is a magnified cross-sectional view of an individual yarn from the jacket of the cable shown in FIG. 2.
Figure 4:
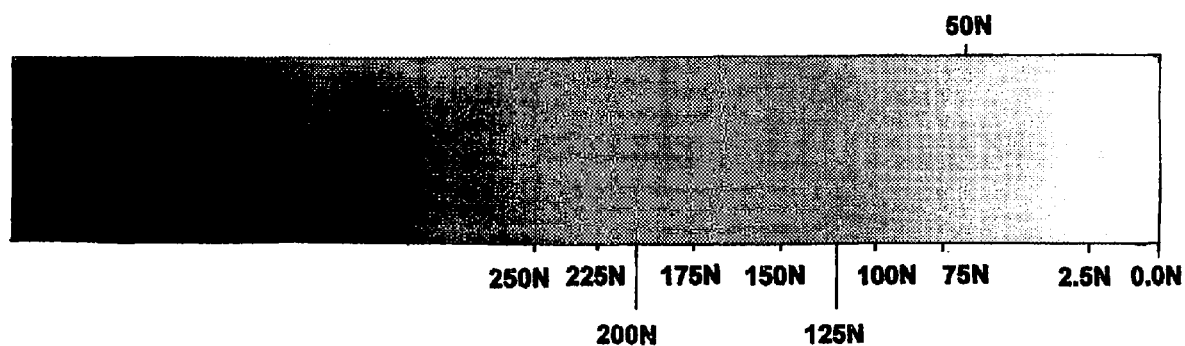
FIG. 4 is an example of a calibrated, gray-scale visual reference, useful for interpreting the appearance of the cable of FIGS. 1-3 to quantify the cable's tension based on the cable's variable visible appearance.

In one method of using the cable of the invention, a visual reference is provided and used in concert with the cable to establish a desired, predetermined tension. FIG. 3 shows one suitable form for the visual reference: a calibrated, gray-scale display, which may be printed on a card or page. Due to limitations imposed by the regulations of the U.S. patent office, the gray-scale is represented here only approximately, by a stippled gradient. It should be understood that this figure represents approximately a continuous gradient of value, graded from white (at the low tension end of the scale, shown to the right) through gray (intermediate tensions) to black (high tensions, shown to the left of the scale). Such gray scale references are easily produced by higher-quality printing processes, including black and white or color photographing printing processes. Legends along the edge of the reference correlate a given shade of gray with a tension known to produce the given shade in a particular cable. Specific tensions are given in Newtons (N). A gray scale can be easily generated and calibrated empirically for any cable of a particular construction and dimensions. The visual transition is found to be generally consistent in cables with similar geometry, materials and dimensions. However, the specific relationship between tension and visual appearance) does depend on diameter, materials, and the geometry of the core, the jacket weave, and other details of jacket construction. For this reason, different calibration curves should preferably be experimentally determined for variant cables that differ in size, materials, or geometry. The particular calibration scale shown in FIG. 4 is valid for a specific embodiment, the "018-100-95 embodiment," described below.

Other forms of visual reference could be provided, including a plurality of cards, swatches or tabs, each having a printed sample for comparison to the cable appearance. A reference stripe of constant value might be incorporate in or alongside the cable. In many applications a single sample should be sufficient to permit comparison with a critical threshold tension. In other applications, multiple references or a continuous scale may be required to "bracket" the appearance of the cable, thereby establishing the range of tension within predetermined limits. Alternatively, optical-electronic measurements can be taken by an instrument and a corresponding tension can be determined, for example by reference to an empirically derived lookup table or a formula.

Although simple black, white, and gray comparisons can be used, more exotic color schemes can also be employed in some embodiments of the invention. At least one core filament can be dyed or otherwise colored to a vivid color. The jacket can be a contrasting color, or neutral. In colorful embodiments, the jacket is adapted to modulate its opacity in response to applied tension. Thus, the apparent color of the cable seems to change in relation to applied tension. As more tension is progressively applied, the jacket transitions progressively to greater transparency and thus transmits more light to and from the core filaments. Thus, at higher tensions the cable can be made to more resemble the color of the core filament(s). It is also possible to lightly color the jacket in a different color from that of the core filaments, producing various color transitions in response to progressive tension. For example, a light yellow jacket around a vivid blue core would tend to produce a color response varying from yellow (low tension) through green (intermediate tension) to blue green (high tension). Many other similar color schemes may be devised, using similar principles.

Generally speaking, the cable of the invention changes its visual appearance in response to the application of tension, by changing the cable's superficial reflection and scattering of incident light. Various vocabularies are available for describing such black-white and color transitions. In general, systems categorizing visual appearance are known as "color-space systems." One such system, the "Munsell" color space system, is widely known; other such systems are also used. In the vocabulary of the Munsell system, the cable of the invention is adapted to change its appearance in at least one of hue, chroma, or value in response to applied tension. In physical terms, the cable is adapted to vary at least one of: a) the amount of reflected light and b) its spectral content, both in relation to the applied tension.

FIGS. 5 and 6 illustrate a mechanism which is presumed to produce or at least contribute to a change in opacity (or transparency) of the jacket 22 in response to cable tension. FIG. 5 shows the cable in a slackened state, with yarns of the jacket 22 partially cut away to reveal the cross section. Each yarn is relatively round and prominent, standing well above the surface of the core 20. In this condition, rays of ambient light 40 strike the thick jacket 22 and are reflected or absorbed by the jacket. When sufficient tension is applied, the configuration of the cable shifts to resemble FIG. 6. In response to tension, the helical, braided or woven jacket yarns 22 tend to flatten out and constrict about the core 20, more tightly constricting about the core. At higher tensions, the jacket yarns even impress into the core slightly. In this tensed configuration the jacket becomes relatively thinner, flatter, and is in better optical contact with the core material. Ambient light 40 tends to pass through the flattened sheath 22 and be absorbed or reflected by the core material, depending on the absorption/reflection characteristics of the core 20. Thus, in the tensed configuration the light absorption and reflection (hence the apparent color) are more dominated by the core.

In a method aspect, the invention includes a method for measuring tension. The method includes the steps of: providing a cable in accordance with the apparatus of the invention (as described above); placing the cable under tension; observing the visual appearance of the cable; and comparing the appearance with a calibrated visual reference, said reference relating the appearance to a corresponding cable tension.

In another method aspect, the invention includes a method for tensioning a cable to a predetermined force, including the steps: providing a cable in accordance with the apparatus of the invention (described above); progressively applying increasing tension to the cable; observing the visual appearance of the cable; fixing the tension when the visual appearance matches a threshold state known to correspond to the desired, predetermined force.

In a specific embodiment (the "018-100-95 embodiment"), useful for orthopedic bone fixation, a cable in accordance with the invention has a core of monofilament, black dyed nylon with having a diameter of about 0.018 inches, clad in a tubular woven jacket of 16 yarns of 100 denier "Dyneema" ultra-high molecular weight polyethylene braided at a density of 95 picks per inch. In the slack state the cable appears a pale gray. As tension is increased, the cable darkens to about 50 percent density gray at around 200 Newtons of tension. Upon further application of tension, the cable darkens to black at around 300 Newtons. The calibration figures from this cable provide the quantitative legends in FIG. 3, discussed above. This example embodiment is found to be particularly useful for orthopedic surgery, having a transition threshold in a tension range which is useful for bone fixation, yet not so high as to crush or damage most bony tissues. The inventors have determined that the cable reversibly changes appearance over at least 100 cycles of loading.

Other cables can be engineered for a desired color-change vs. tension characteristic. Strain in the fibers is related in a complex manner to the tension applied to the cable. This suggests that the cable can be scaled by varying its construction to change the cable's strength while maintaining the strain in the jacket fibers within the region of mechanical-optical reaction. To produce more accurate calibration, empirical data should be taken from a particular cable design to develop a quantified gray scale relating cable appearance to applied tension. Fiber sizes, numbers, and diameters, and weave geometry can all be varied to scale the cable to a desired tension characteristic.

While several illustrative embodiments of the invention have been shown and described, numerous variations and alternate embodiments will occur to those skilled in the art. Other colorations, dimensions, and load/darkness characteristics can be produced. The load/darkness characteristics may vary in response to a refractive index of a medium within which the cable is placed, so different calibration curves or visual comparisons may be required for cables that inhabit different environments (including water, bodily fluids, or other environments). Different parts of the cable might receive different treatments; differing cables might be linked together either in tandem or in parallel configurations. Such arrangements could be used to extend the range of readable tensions or to make the indications more easily visible. Such variations and alternate embodiments are contemplated, and can be made without departing from the spirit and scope of the invention as defined in the appended claims.

We claim:

1. A surgical cable, suitable for use in orthopedic surgery, comprising:
   at least one core filament having a visually distinctive appearance;
   a jacket, coaxially wrapped around at least a portion of said core filament; wherein said jacket is adapted to reversibly change its opacity in response to tensile stress, thereby modulating the visibility of said core filament in relation to such stress, and
   a visual reference, wherein said visual reference is calibrated to be in concert with a range of predetermined tensions, and wherein said visual reference is operable for matching said visibility of said core filament to said range of predetermined tensions.

2. The surgical cable of claim 1, wherein said jacket comprises at least one yarn of an ultra-high molecular weight polyethylene polymer.

3. The surgical cable of claim 1, wherein said core filament comprises a dark filament.

4. The surgical cable of claim 1, wherein said core filament comprises a colored filament.

5. The surgical cable of claim 1, wherein said core filament comprises a dyed nylon filament.

6. The surgical cable of claim 1, wherein said jacket comprises at least one yarn having a generally white appearance in the absence of applied tension, and is adapted to transition to a more translucent appearance in response to tension.

7. The surgical cable of claim 6, wherein said yarns comprising said jacket are braided in an arrangement that is predetermined to produce said transition at a predetermined threshold tension.

8. The surgical cable of claim 6, wherein said jacket comprises a plurality of yarns of an ultra-high molecular weight polyethylene polymer braided at a density of 95 picks per inch, and wherein said core comprises a black, nylon monofilament.

* * * * *